(12) United States Patent
Oliver

(10) Patent No.: US 6,226,422 B1
(45) Date of Patent: May 1, 2001

(54) VOICE ANNOTATION OF SCANNED IMAGES FOR PORTABLE SCANNING APPLICATIONS

(75) Inventor: Thomas C. Oliver, Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/026,082

(22) Filed: Feb. 19, 1998

(51) Int. Cl.[7] .................................................. G06K 9/22
(52) U.S. Cl. .......................... 382/313; 382/312; 375/202
(58) Field of Search .................................. 382/312, 313; 235/472.01; 386/95, 117; 375/202

(56) References Cited

U.S. PATENT DOCUMENTS

| | | | |
|---|---|---|---|
| 4,951,147 | * 8/1990 | Aknar et al. | 358/209 |
| 5,430,558 | 7/1995 | Sohaei et al. | 358/473 |
| 5,471,009 | * 11/1995 | Oba et al. | 84/645 |
| 5,535,011 | * 7/1996 | Yamagami et al. | 386/117 |
| 5,680,500 | * 10/1997 | Takahashi et al. | 386/95 |
| 5,708,826 | * 1/1998 | Ikeda et al. | 707/501 |
| 5,794,251 | * 8/1998 | Watanabe et al. | 707/200 |
| 5,838,718 | * 11/1998 | Ichihashi | 375/202 |
| 5,905,250 | * 5/1999 | Fukuda et al. | 235/472.01 |

* cited by examiner

Primary Examiner—Bijan Tadaton
Assistant Examiner—Anh Hong Do

(57) ABSTRACT

A scanning device that scans a document and allows a user to voice annotate the scanned document by speaking into a voice pickup located in the device. The data from scanning is saved as an image data file in device memory. The device digitizes the speech input, compresses the speech, and saves the speech as a voice clip file in device memory. The device establishes a connection between the voice clip file and the image data file. When the user uploads the image data file to a host computer, the voice clip file is automatically transferred. When the user selects an image data file through a user interface, the voice clip is automatically played back or the user is notified of the voice clip. The play back process involves decompressing the speech and then reformatting the speech into a format which the host computer sound card can recognize.

19 Claims, 8 Drawing Sheets

VOICE ANNOTATION OF SCANNED IMAGES FOR PORTABLE SCANNING APPLICATIONS

FIELD OF THE INVENTION

This invention relates to document scanners and more particularly to portable document scanners. Even more particularly, the invention relates to voice annotating the resulting image data file obtained from scanning a document with a portable document scanner.

BACKGROUND OF THE INVENTION

Portable hand held document scanners have proven to be very useful tools in certain situations. Their portability and ease in gathering information from various locations away from a users office or work place are two of the primary benefits of such devices.

A user may be on a business trip visiting various company sites. At each site the user may need to scan documents pertaining to one or several different projects which will be worked on back at the user's office or work place. Once back at the user's office or work place, the scanned documents can be uploaded to a host computer and then viewed or accessed through the appropriate application software.

With current portable hand held document scanners, retrieving a particular document from device memory to download to a host computer may require displaying numerous scanned documents in sequence until the desired document is found. This can be a very time consuming and inefficient process, especially if there are numerous documents held in device memory.

Also, if numerous drawings or schematics are scanned into the device that are similar in appearance, or the user is not familiar with the documents, or the documents are not inherently labeled to tell them apart, the user may experience difficulty in determining which document is which and the project with which each document is associated when back at the user's office or work place. In addition, someone other than the user who scanned the documents may download and use the documents. This person is in an even less knowledgeable position to sort out and identify each of the scanned documents.

There is thus a need in the art to annotate scanned documents with a description of the document, or background information about the document, at the time the document is being captured on a portable hand held document scanner. There is a need in the art to accomplish this annotation in a fast, efficient, and device resource conserving fashion. There is also a need in the art to be able to quickly review scanned documents held in device memory in order to identify the particular document or documents that are desired for purposes of uploading to a host computer or displaying on the portable hand held document scanner display.

It is thus apparent that there is a need in the art for an improved method or apparatus which solves these problems. The present invention meets these and other needs in the art.

SUMMARY OF THE INVENTION

It is an aspect of the present invention to voice annotate an image data file of a document scanned by a document scanner.

It is another aspect of the invention to save the voice annotation as a separate file from the image data file.

Yet another aspect of the invention is to establish a connection between the image data file and the voice annotation file.

Still another aspect of the invention is to compress the data contained in the voice annotation file before storing in device memory.

A further aspect of the invention is to play back a series of voice annotation files and to select one or more connected image data files for further action, such as uploading the selected image data files to a host computer.

A still further aspect of the invention is to automatically transfer the voice annotation file connected with an image data file to a host computer when that image data file is uploaded to the host computer.

Another aspect of the invention is to automatically notify a user that an image data file has a connected voice annotation file whenever the user selects the image data file.

Another further aspect of the invention is to play back the voice annotation file when selected by the user from a user interface program in the host computer by decompressing the data contained in the voice annotation file and reformatting the data to an audio file format recognized by the sound card driver software in the host computer.

The above and other aspects of the invention are accomplished in a document scanning device that scans a document and stores it as an image data file in device memory, and then annotates the image data file by capturing speech data using a voice pickup located in the device. The device digitizes the speech input, compresses the speech, and then stores the speech data in device memory as a voice annotation file. The device provides a "connection" between the voice annotation file, also referred to as a voice clip, and the image data file. When the user uploads the image data file to a host computer, the voice clip is also automatically transferred.

When the user, or another person, selects the file through a user interface (UI) program, the UI program recognizes that a voice clip is connected with the image data file. The UI program may automatically play the voice clip, or notify the user that there is a voice clip and wait for an indication from the user to play the voice clip. After the user indicates a desire to play the voice clip, the play back process begins. The play back process involves decompressing the speech and then reformatting the speech into a format which the host computer sound card driver software can recognize. The sound card then outputs a signal to an audio speaker.

In an alternate implementation of the invention, the voice clip is stored in an industry standard audio file format, for example a WAV file, at the time of capture.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
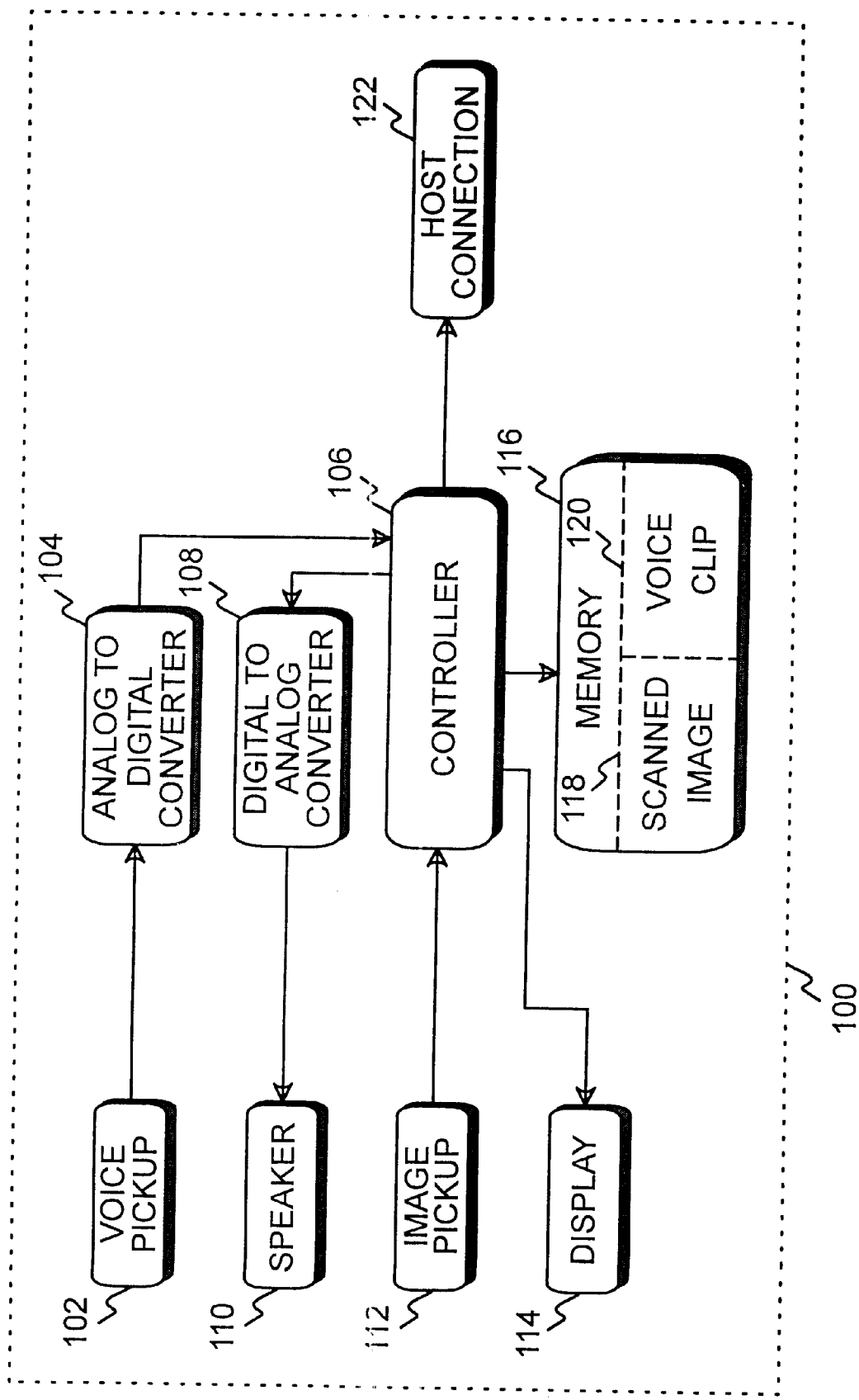
FIG. 1 shows a block diagram of a document scanning device of the present invention.

FIG. 1 shows a block diagram of a document scanning device of the present invention. Referring now to FIG. 1, document scanning device 100 has an image pickup component 112, which is positioned optically with a document to be scanned. A command to scan is given to document scanning device 100, and the user moves document scanning device 100 such that image pickup component 112 scans a portion or all of the surface of the document. A command to stop scanning is given to document scanning device 100. Image pickup component 112 optically reads sample points from the surface of the document and generates a grey scale value for each point sampled. Connected to image pickup component 112 is controller 106 which receives the grey scale values for the sample points and assembles them into an image array. The result may be output to display 114, which is connected to controller 106, showing a visual representation of the surface of the scanned document. Controller 106 may also convert the grey scale values to binary form for display or for storage. The image array, in either grey scale or binary form, is passed from controller 106 and stored as an image data file in scanned image portion 118 of memory 116, which is connected to controller 106.

After scanning a document, the user may speak into voice pickup 102 to voice annotate the image data file with a descriptive narrative or other information deemed useful by the user. Voice pickup 102 converts the user's speech into an analog signal and is connected to analog-to-digital converter 104, which converts the analog signal generated by voice pickup 102 to a digital signal. The digital signal is sent to controller 106. Controller 106 stores the voice annotation as a separate voice annotation file in voice clip portion 120 of memory 116 and connects the image data file with the voice annotation file.

The user may request that document scanning device 100 play back a voice annotation file. Controller 106 retrieves the voice annotation file requested from voice clip portion 120 of memory 116, passes it to digital-to-analog converter 108, which converts the digital signal to an analog signal, and passes the signal to speaker 110 which generates audio output.

Figure 2:
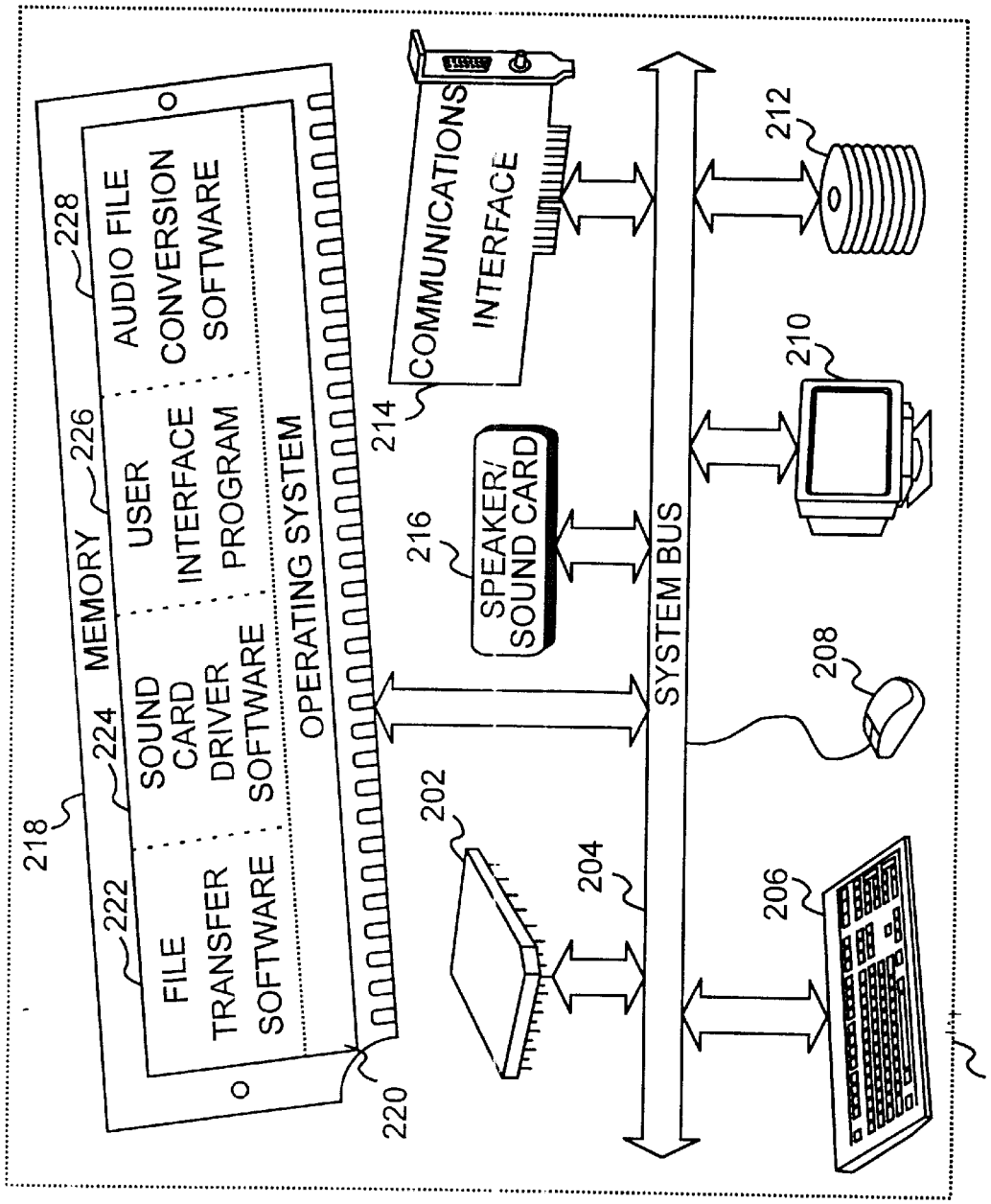
FIG. 2 shows a block diagram of a host computer system of the present invention.

The user may also request that document scanning device 100 upload image data files to a host computer (FIG. 2). Controller 106 retrieves a requested image data file from scanned image portion 118 of memory 116 and passes it to host connection 122, which transfers the image data file and the connected voice annotation file to the host computer.

FIG. 2 shows a block diagram of a host computer system associated with the present invention. Referring now to FIG. 2, host computer system 200 contains a processing element 202. Processing element 202 communicates to other elements of host computer system 200 over a system bus 204. A keyboard 206 allows a user to input information into host computer system 200 and a graphics display 210 allows host computer system 200 to output information to the user. A mouse 208 is also used to input information and a storage device 212 is used to store data and programs within host computer system 200. Communications interface 214, also connected to system bus 204, receives information from document scanning device 100 (FIG. 1). Speaker/sound card 216 connected to system bus 204 outputs audio information to the user. Some host computer systems may not have a sound card, in which case the speaker is driven only by software. A memory 218, also attached to system bus 104, contains an operating system 220, file transfer software 222, sound card driver software 224, user interface program 226, and audio file conversion software 228.

File transfer software 222 receives image data files and voice annotation files transferred from host connection 122 of document scanning device 100 (FIG. 1) through communications interface 214 and saves them to storage device 212. When the user accesses user interface program 226, and selects an image data file having a voice clip, user interface program 226 may automatically play the voice clip, or notify the user that there is a voice clip and wait for an indication from the user to play the voice clip. The user can then choose to play the voice clip which will start the play back process. If the user chooses to listen to the voice clip, or if play back is automatic, audio file conversion software 228 decompresses and converts the voice annotation file to an audio file format recognizable by sound card driver software 224. Sound card driver software 224 passes the information to speaker/sound card 216 which outputs the audio information to the user. After hearing the audio information, the user may choose to view the image data file. If so, user interface program 226 is suspended, the application program associated with the image data file is called, and the image data file is displayed in graphics display 210.

Figure 3:
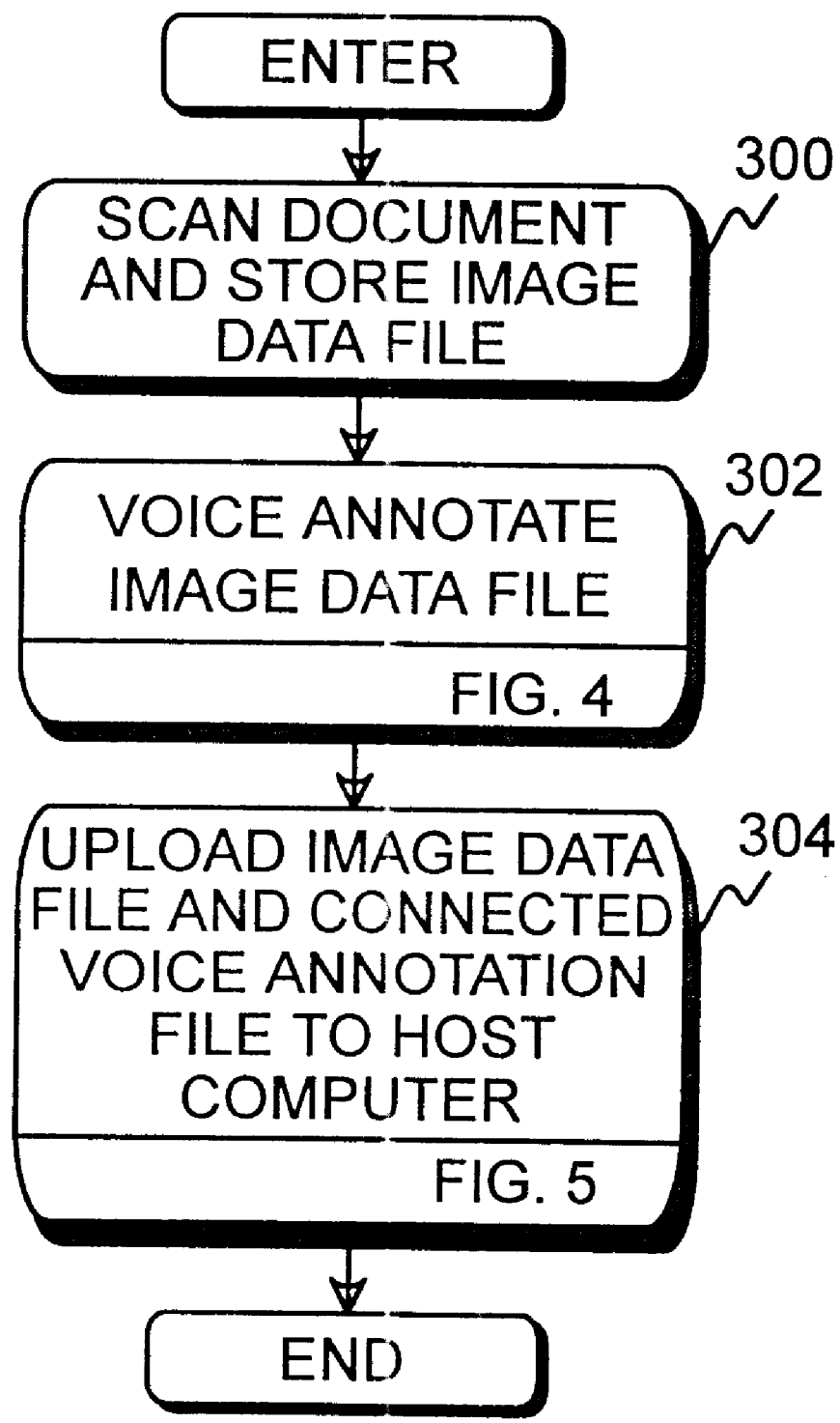
FIG. 3 shows a flow chart of the overall flow of the operation of the document scanning device.

FIG. 3 shows a flow chart of the overall flow of the operation of the document scanning device. Referring now to FIG. 3, in block 300 document scanning device 100 (FIG. 1) is used to scan a document and store the resulting image data file in scanned image portion 118 of memory 116 (FIG. 1). In block 302 control passes to FIG. 4 where the image data file is voice annotated. After returning from FIG. 4, block 304 passes control to FIG. 5 where the image data file and the voice annotation file are uploaded to a host computer. After returning from FIG. 5, the operation ends.

Figure 4:
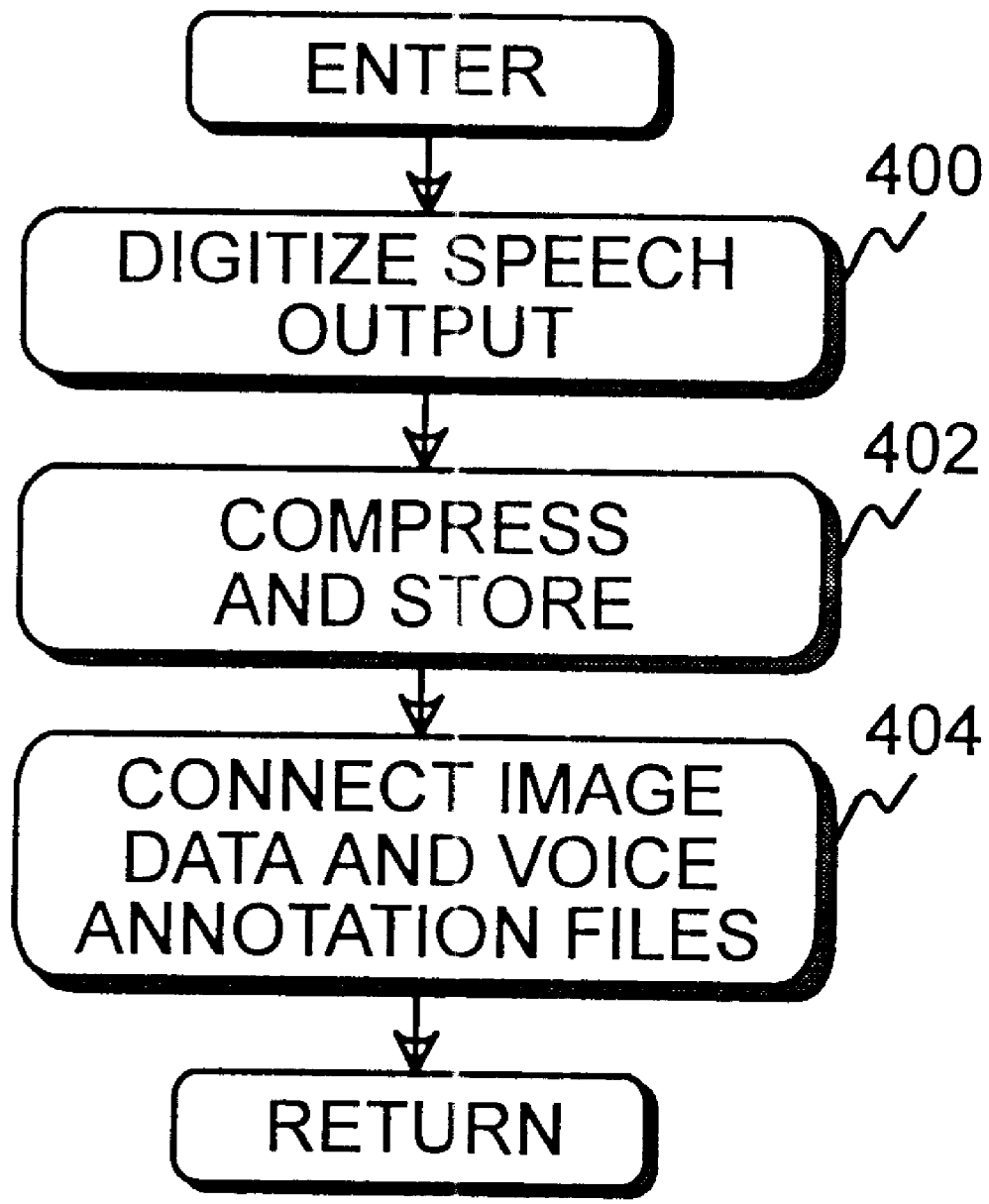
FIG. 4 shows a flow chart of the voice annotation of an image data file.

FIG. 4 shows a flow chart of voice annotation of an image data file. Referring now to FIG. 4, block 400 digitizes a user's speech input. In block 402 the digitized speech is compressed and stored as a voice annotation file in voice clip portion 120 of memory 116 (FIG. 1). Block 404 connects the image data file to the voice annotation file. In the preferred embodiment of the invention, this is accomplished by giving the same file name to both the image data file and the voice annotation file, and giving the two files a different file name extension. Control then returns to FIG. 3. Alternatively, the digitized speech may be stored in an industry standard audio file format, such as the WAV format used in PC's. This alternative may require more memory in document scanning device 100.

Figure 5:
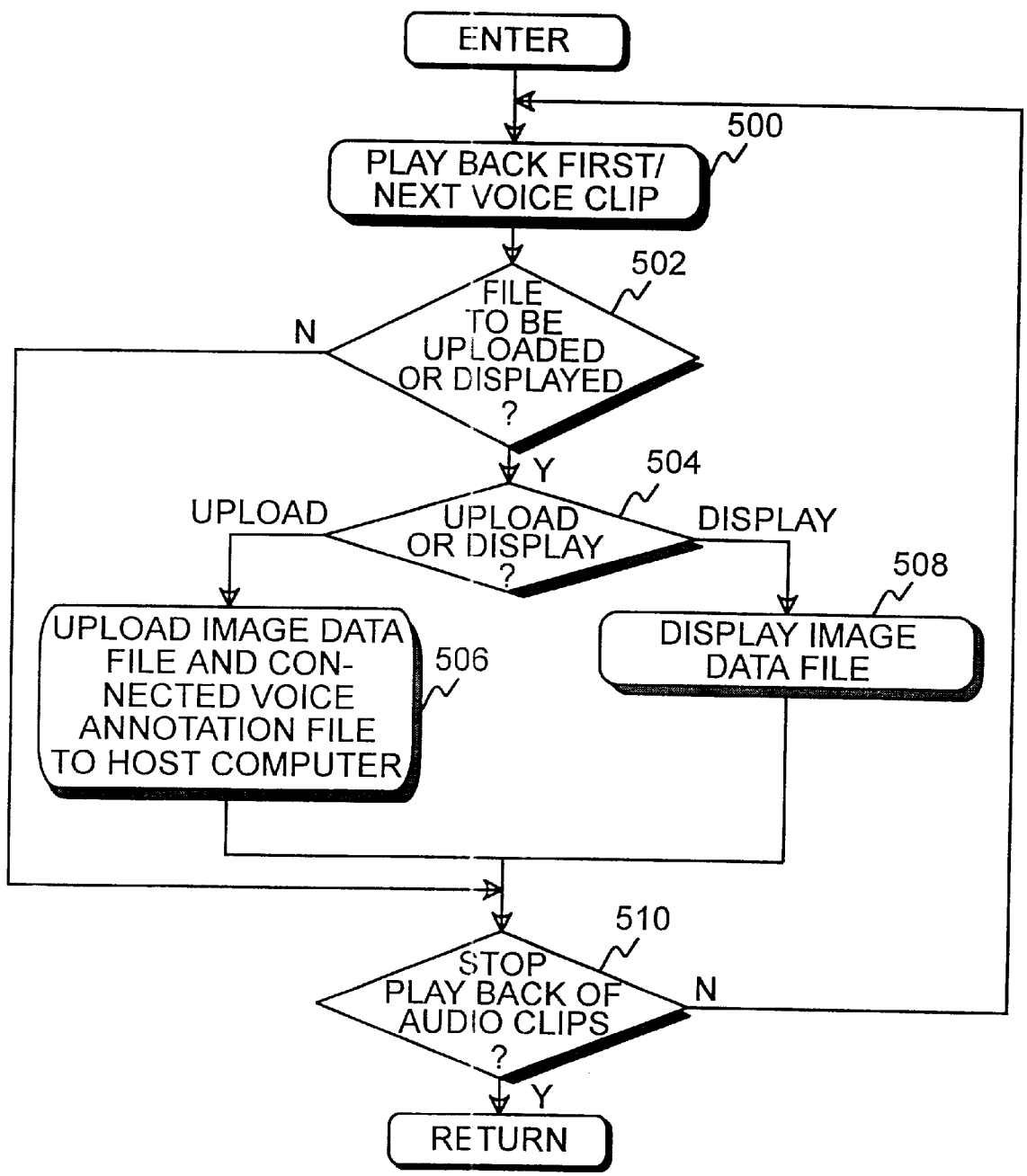
FIG. 5 shows a flow chart of uploading image data files and voice annotation files to a host computer.

FIG. 5 shows a flow chart of uploading image data files and their connected voice annotation files to a host computer. Referring now to FIG. 5, in block 500 the user plays back and listens to a first voice clip. Block 502 receives input from the user to determine if the image data file described by the connected voice clip is an image data file the user wants to upload to a host computer or view on display 114 (FIG.

Figure 6:
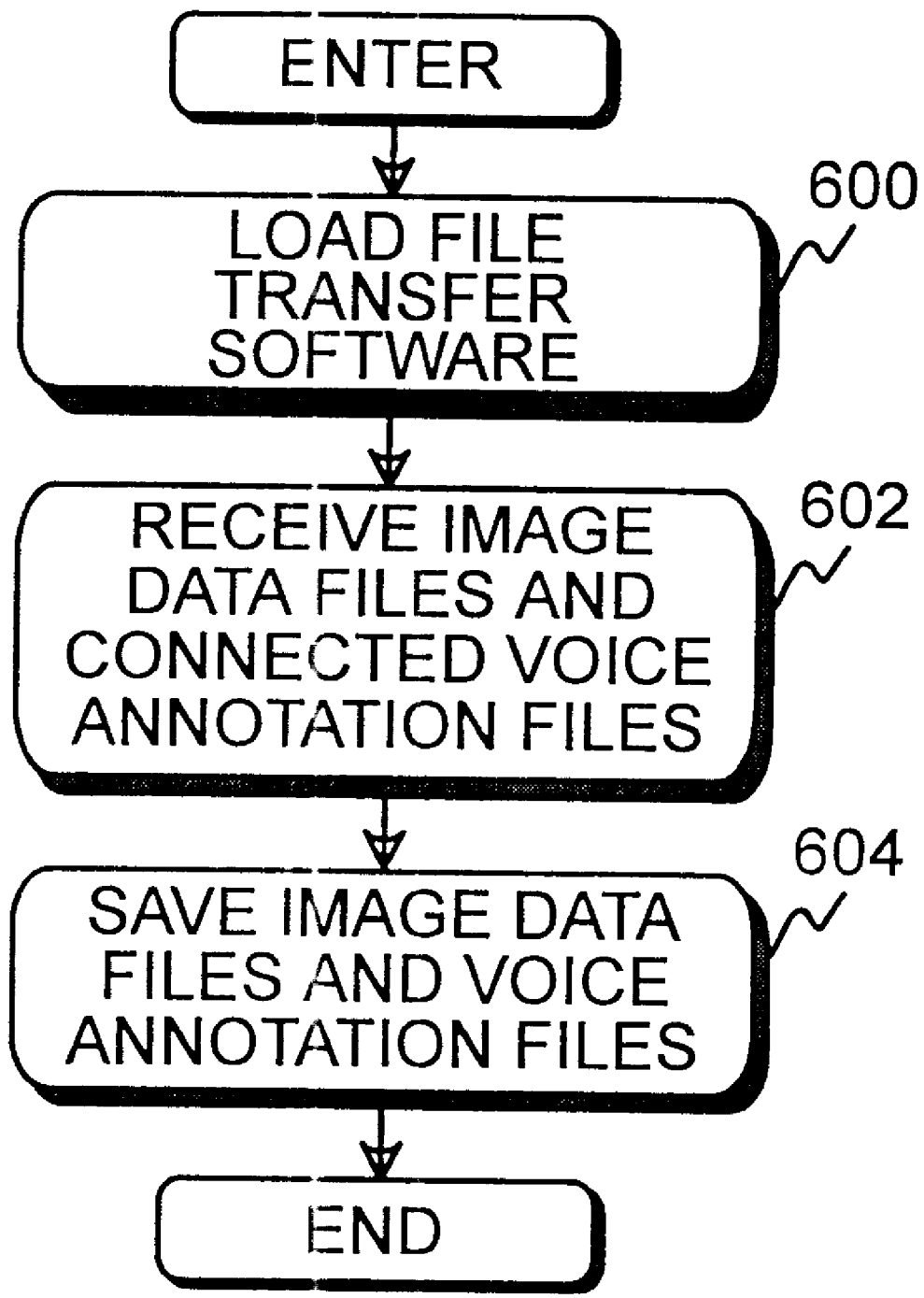
FIG. 6 shows a flow chart of a host computer receiving image data files and voice annotation files from the document scanning device.

1). If not, then control passes to block 510. If yes, control passes to block 504 where the user selects to upload or display the image data file. If the user selects upload, block 504 goes to block 506, which uploads the image data file to a host computer. In the preferred embodiment, the voice annotation file connected to the image data file is automatically transferred with the image data file. The upload may be made by cable through a serial port, through an infrared beam, or any other appropriate means. FIG. 6, described below, shows the host computer receiving the uploaded image data files and connected voice annotation files. After uploading, control passes to block 510.

If the user selects to display the image data file in block 504, control passes to block 508 where the image data file is displayed on display 114 (FIG. 1). Control then passes to block 510.

In block 510 the user determines if he wants to stop the play back of voice clips. If not, then control returns to block 500 where the user plays back the next voice clip. If yes, then control returns to FIG. 3.

FIG. 6 shows a flow chart of a host computer receiving image data files and their connected voice annotation files from the document scanning device. Referring now to FIG. 6, block 600 loads file transfer software 222 into memory 218 (FIG. 2). In block 602, communications interface 214 (FIG. 2) receives the image data files and their connected voice annotation files from document scanning device 100 (FIG. 1). The transfer may be made by cable through a serial port, through an infrared beam, or any other appropriate means. In block 604, file transfer software 222 saves the transferred image data files and voice annotation files to storage device 212 (FIG. 2) and then the operation ends.

Figure 7:
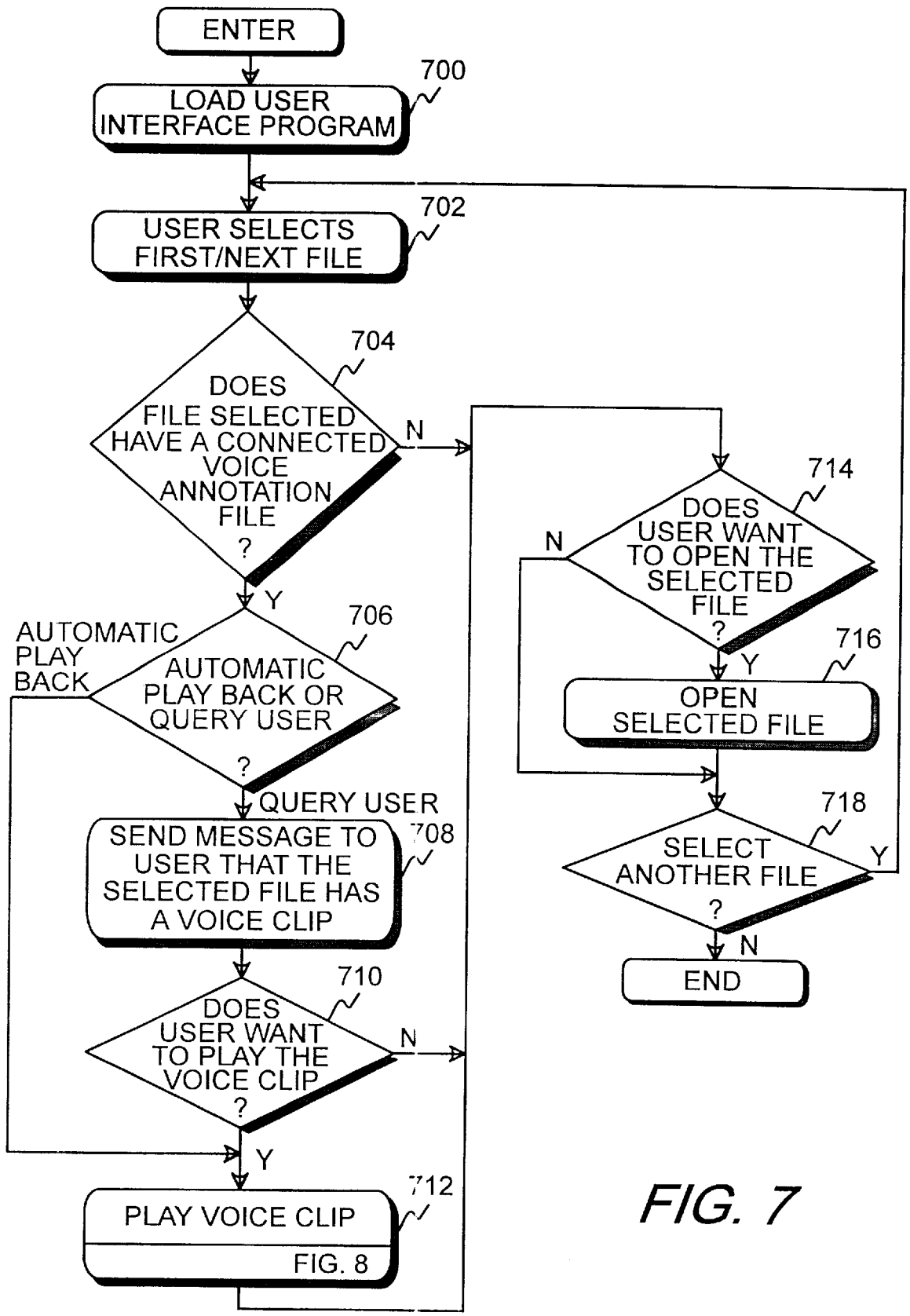
FIG. 7 shows a flow chart of a user interface program on a host computer utilizing voice annotation files connected with image data files.

FIG. 7 shows a flow chart of a user interface program on a host computer utilizing voice annotation files connected with image data files. Referring now to FIG. 7, block 700 loads user interface program 226 into memory 218 (FIG. 2). Block 702 receives user input to select a file that has been stored on storage device 212 (FIG. 2). Block 704 determines if the file selected has a connected voice annotation file. If not, control passes to block 714. If the file does contain a connected voice annotation file, block 704 transfers to block 706 which determines if play back is to be automatic or if the user is to be queried. If play back is automatic, control passes to block 712. If not, control passes to block 708 which sends a message to the user through graphics display 210 (FIG. 2) that the selected file has a connected voice clip. Then, block 710 receives user input on whether or not to play back the voice clip. If the user selects not to play back the voice clip, control passes to block 714. If the user selects to play back the voice clip, block 710 goes to block 712 which calls FIG. 8, where the voice clip is played back to the user.

Figure 8:
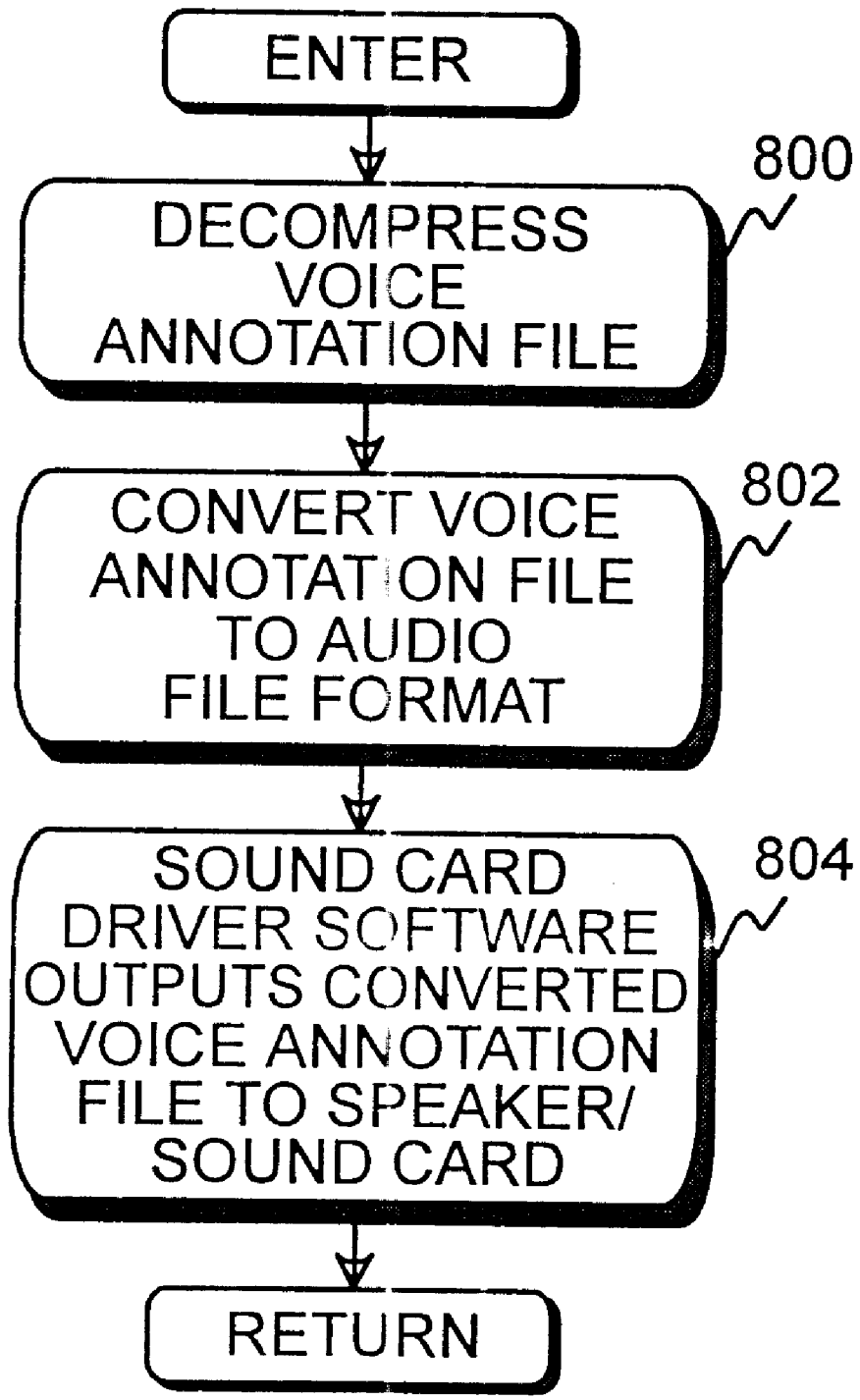
FIG. 8 shows a flow chart of a host computer playing back a voice annotation file.

After returning from FIG. 8, block 714 receives input from the user whether or not to open the selected file. If not, control passes to block 718, where the user determines whether or not to select another file. If not, user interface program 226 ends. If the answer in block 718 is yes, then control passes to block 702 where the user selects another file.

If the answer in block 714 is yes, then in block 716 the selected file is opened and user interface program 226 (FIG. 2) is suspended until the user closes out the selected file, after which control returns to block 718.

FIG. 8 shows a flow chart of a host computer playing back a voice annotation file. Referring now to FIG. 8, block 800 decompresses the voice annotation file selected by the user. In block 802, audio file conversion software 228 is loaded into memory 218 (FIG. 2) and converts the voice annotation file to an audio file format recognized by sound card driver software 224 (FIG. 2). One skilled in the art will recognize that when the voice clip is stored in an industry standard audio file format, such as WAV, the steps in blocks 800 and 802 are not necessary.

In block 804, sound card driver software 224 outputs the converted voice annotation file to speaker/sound card 216 (FIG. 2) for audio output. At the end of the play back of the converted voice annotation file, control returns to FIG. 7.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A scanning device comprising:

an image pickup component wherein said image pickup component reads a plurality of sample points from a portion of a surface of a document and generates a value for each of said plurality of sample points;

a controller connected to said image pickup component wherein said controller receives and assembles said values into an image array;

a memory connected to said controller wherein said controller stores said image array as an image data file in said memory;

a voice pickup for capturing a user's speech and converting said user's speech to an incoming analog signal; and an analog-to-digital converter connected to said voice pickup and connected to said controller, wherein said incoming analog signal from said voice pickup is converted to a digital signal and passed to said controller, wherein said controller stores said digital signal in said memory as a voice annotation file, and connects said voice annotation file and said image data file.

2. A scanning device according to claim 1 further comprising:

a digital-to-analog converter connected to said controller, wherein said digital signal stored as said (voice annotation file is passed from said controller to said digital-to-analog converter and is converted to an outgoing analog signal; and a speaker connected to said digital-to-analog converter, wherein said outgoing analog signal from said digital-to-analog converter is sent to said speaker for audio output.

3. A scanning device according to claim 1 further comprising:

a display connected to said controller, wherein said image array stored as said image data file is passed from said controller to said display wherein a visual representation of said portion of said surface of said document is displayed.

4. A scanning device according to claim 1 further comprising:

a host connection connected to said controller, wherein said image data file and said voice annotation file are uploaded through said host connection to a communications interface of a host computer.

5. A scanning device according to claim 4 further comprising:

a system bus connected to said communications interface;

a host memory connected to said system bus;

a storage device connected to said system bus;

a speaker/sound card connected to said system bus;

a key board connected to said system bus;

a mouse connected to said system bus;

a graphics display connected to said system bus; and a processing element connected to said system bus wherein said processing element communicates with said communications interface, said host memory, said storage device, said speaker/sound card, and said display over said system bus.

6. A scanning device according to claim 5 further comprising:

file transfer software located in said host memory of said host computer wherein said file transfer software receives said uploaded image data file and said uploaded voice annotation file from said communications interface and saves said uploaded image data file and said uploaded voice annotation file to said storage device.

7. A scanning device according to claim 6 further comprising:

a user interface program in said host memory of said host computer wherein a user selects said uploaded image data file through said keyboard or through said mouse, and further wherein file conversion software located in said host memory converts said uploaded voice annotation file to an audio file format recognized by sound card driver software located in said host memory, wherein said sound card driver software converts said uploaded voice annotation file in said audio file format to an analog signal for audio output through said speaker/sound card, and said uploaded image data file is displayed on said graphics display as a visual representation of said portion of said surface of said document.

8. A method of scanning images comprising the steps of:

(a) scanning a portion of a surface of a document with an image pickup component of a scanning device wherein said image pickup component reads a plurality of sample points from said portion of said surface of said document;

(b) generating a grey scale value for each of said plurality of sample points;

(c) assembling each of said grey scale values into an image array;

(d) storing said image array as an image data file in a memory;

(e) capturing a user's speech and converting said captured user's speech to an incoming analog signal;

(f) converting said incoming analog signal to a digital signal;

(g) storing said digital signal into said memory as a voice annotation file; and (h) connecting said image data file and said voice annotation file.

9. A method of scanning images according to claim 8 wherein step (c) is replaced by the following new step (c):

(c) converting each of said grey scale values into a binary value and assembling each of said binary values into an image array.

10. A method of scanning images according to claim 8 wherein step (g) further comprises compressing said digital signal prior to storing as said voice annotation file.

11. A method of scanning images according to claim 8 wherein step (g) further comprises storing said digital signal as said voice annotation file in an industry standard audio file format.

12. A method of scanning images according to claim 8 wherein step (h) further comprises connecting said image data file and said voice annotation file by giving said image data file and said voice annotation file a same file name and giving said image data file a first file extension name and giving said voice annotation file a second file extension name.

13. A method of scanning images according to claim 8 further comprising the following step:

(i) repeating steps (a) through (h) for a portion of a surface of a next document.

14. A method of scanning images according to claim 8 further comprising the following steps:

(i) converting said digital signal stored as said voice annotation file to an outgoing analog signal; and (j) sending said outgoing analog signal to a speaker for audio output.

15. A method of scanning images according to claim 8 further comprising the following step:

(i) displaying said image array stored as said image data file on a display wherein a visual representation of said portion of said surface of said document is displayed.

16. A method of scanning images according to claim 8 further comprising the following step:

(i) uploading said image data file and said voice annotation file stored in said memory through a host connection connected to said memory to a communication interface of a host computer, wherein said host connection communicates with said communication interface; and (j) storing said uploaded image data file and said uploaded voice annotation file in a storage device connected to said host computer.

17. A method of scanning images according to claim 16 further comprising the following steps:

(k) receiving input into a user interface program to select said uploaded image data file from said storage device;

(l) decompressing said uploaded voice annotation file from said storage device;

(m) converting said decompressed uploaded voice annotation file to an audio file format;

(n) processing said converted decompressed uploaded voice annotation file in said audio file format in sound card drive software through a speaker/sound card for audio output; and (o) repeating steps (k) through (n) for a next uploaded image data file.

18. A method of scanning images according to claim 17 wherein step (k) further comprises the following steps (k1) and (k2):
- (k1) displaying on a graphics display in said host computer an indication that said uploaded image data file has a connected said uploaded voice annotation file; and
- (k2) receiving input to select said uploaded voice annotation file for audio play back.

19. A method of scanning images according to claim 17 wherein step (n) further comprises the following steps (n1) and (n2):
- (n1) selecting said uploaded image data file for display; and
- (n2) displaying said uploaded image data file on said graphics display in said host computer.

* * * * *